United States Patent [19]

Konaya

[11] Patent Number: 4,511,098

[45] Date of Patent: Apr. 16, 1985

[54] FILM STORAGE DEVICE

[75] Inventor: Yoshikazu Konaya, Kanagawa, Japan

[73] Assignee: Fuji Photo Film Co., Ltd., Kanagawa, Japan

[21] Appl. No.: 549,530

[22] Filed: Nov. 7, 1983

[30] Foreign Application Priority Data

Nov. 8, 1982 [JP] Japan ................................ 57-194513
Dec. 6, 1982 [JP] Japan ................................ 57-212775

[51] Int. Cl.[3] .......................... G03B 1/58; G03D 3/12

[52] U.S. Cl. .................................... 242/56 R; 242/58; 242/64; 242/71

[58] Field of Search .............. 242/54 R, 55, 56, 56 A, 242/58, 58.6, 64, 71.1, 71.2, 79, 80, 75.1; 352/125

[56] References Cited

U.S. PATENT DOCUMENTS 1,202,346 10/1916 Wooden ............................ 242/71 B
3,659,514 5/1972 Steblay ........................... 242/67.1 R
3,690,751 9/1972 Von Fischern et al. ....... 242/181 X

*Primary Examiner*—Stanley N. Gilreath

*Assistant Examiner*—Lloyd D. Doigan

*Attorney, Agent, or Firm*—Sughrue, Mion, Zinn, Macpeak & Seas

[57] ABSTRACT

A film storage device, such as may be used for temporarily storing microfilm between a photographing section and a processing section in a unitary photographing/processing apparatus, in which the cut end of the film is prevented from being wound up onto take-up reel after cutting. First and second reels are rotatably mounted along an axis which is perpendicular to a rotatable shaft bearing the two reels. A rotary plate is connected to the shaft having a plane which is also perpendicular to the axis of the shaft. A drive belt is selectively engageable with the take-up reel or the rotary plate. The position of the drive belt is synchronized with a cutting mechanism. A stretchable elastic drive belt is laid between the take-up reel and a film guide roller. When the film is cut, elastic force accumulated in the drive belt is released, causing the take-up reel to rotate reversely, and thereby preventing the cut end of the film from being wound onto the take-up reel.

7 Claims, 3 Drawing Figures

FILM STORAGE DEVICE

BACKGROUND OF THE INVENTION

The present invention relates to a device for temporarily storing a film of material, particularly, photographic film or paper. More specifically, the invention pertains to a film storage device for use in an apparatus such as a microfilm processor which combines functions of both photographing (image formation) and developing. In such an apparatus, there are serially arranged a number of processing sections or stations, including a photographing station, a developing station, a washing station, a drying station, and the like. Also, in such an apparatus, it is necessary to provide a film storage unit between the photographing station and the first and subsequent stations (hereinafter referred to collectively as the "processing section") which take part in the processing of the film after it has been exposed. The reason why such a film storage unit is necessary is that the rate at which the film exits the photographing section is usually different than the rate at which the film travels through the processing section. Thus, if no storage device were provided between the photographing section and the processing section, the film would be torn.

The inventor of the present invention has previously proposed one such system. A description of that system may be found in U.S. patent application Ser. No. 450,176, filed Dec. 16, 1982. In this system, two different storage units are provided. Each of the storage units is constituted by a reel and a pair of guide rollers for guiding the film onto and from the respective reel. The reels are provided on opposite sides of a rotatable support member, the latter extending perpendicular to the axes of rotation of the reels. Film is first taken from the photographing section and wound up onto one of the reels. The support member is then rotated, after the film has been cut, so that the film from the photographing station can be wound onto the second reel. The film from the first reel is then simultaneously directed to the processing section.

In this system, it is necessary to stop the rotation of the take-up reel immediately upon the film being cut. However, because the reel unavoidably has mechanical inertia, stopping the film at precisely the correct position is difficult. Hence, the film has a tendency to be completely wound up onto the take-up reel. This, in turn, necessitates the provision of a mechanism to pull the end of the film off the reel and to feed the film to the processing section when the function of the reel is changed from that of a take-up reel to a feeding reel. (It is not, of course, possible to perform this operation manually since the operation must be performed in total darkness.) This mechanism is also complex and expensive. Accordingly, there is a need for simple device for maintaining the end of the film in the vicinity of the cutting position, that is, to prevent the film from being wound up onto the take-up reel after it has been cut.

SUMMARY OF THE INVENTION

Accordingly, the invention provides a device for performing this function which meets these requirements. More specifically, the invention provides a film storage device, which is positioned between the photographing section and the processing section in a combined film exposing and developing system, and which includes two reels for winding and storing film that are selectively positionable to receive and dispense film, which may occur at different rates. In accordance with one important aspect of the invention, a rotary plate is provided which is attached to a rotary shaft used to rotate the positions of the two reels. A winding force transmitting device is selectively positionable to drive either the take-up reel or the rotary plate. The winding force transmitting device is selectively engageable with the take-up reel and the rotary plate as directed by a track switching signal. Yet further, the invention provides such a mechanism in which, according to another important aspect of the invention, the drive for the take-up reel is released when the film is being cut while the end of the film adjacent the cut is held. A pair of feed rollers is provided between the take-up reel and the cutter for the film. A stretchable elastic drive belt is engaged both with the take-up reel and with one of the rollers of the aforementioned pair of rollers. With this structure, when the drive for the take-up reel is released upon the film being cut, the take-up reel is caused to rotate in the reverse direction due to the contraction of the elastic drive belt. The end of the film is thereby prevented from being wound up onto the take-up reel.

DESCRIPTION OF THE PREFERRED EMBODIMENTS

Figure 1:
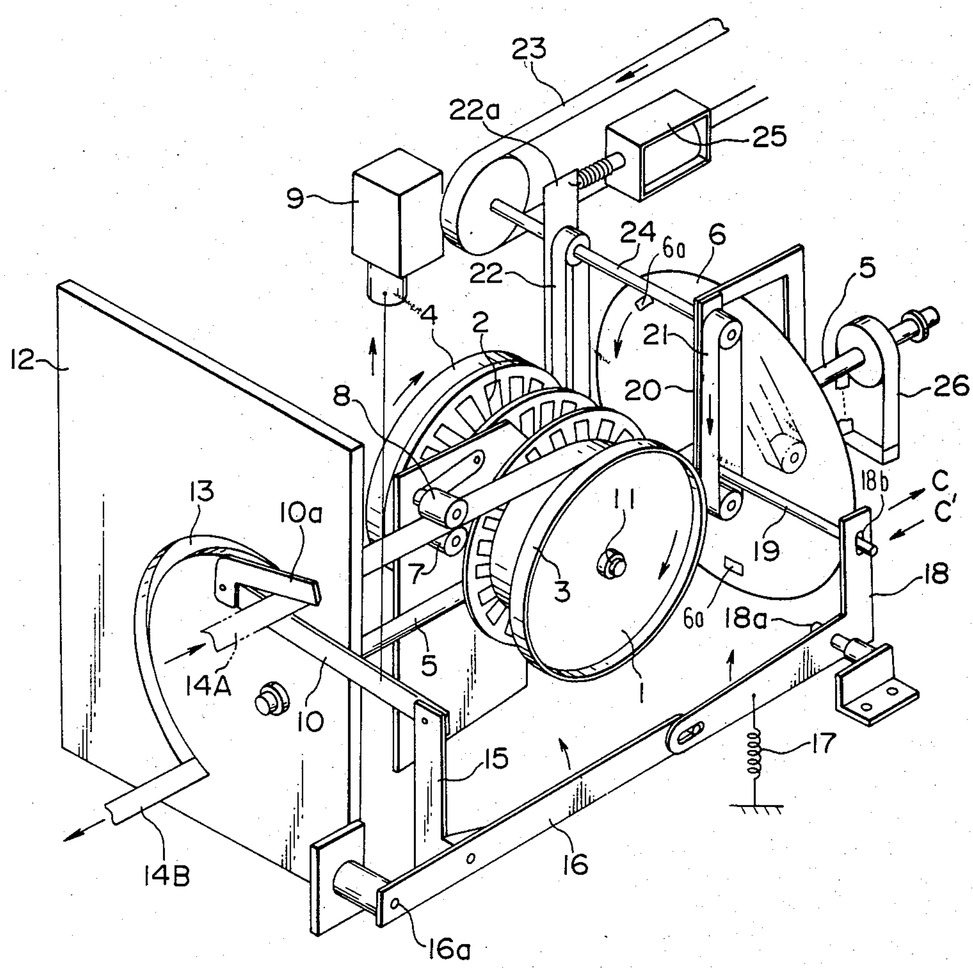
FIG. 1 is a perspective view of a film storage device constructed in accordance with the teachings of the invention.
Figure 2:
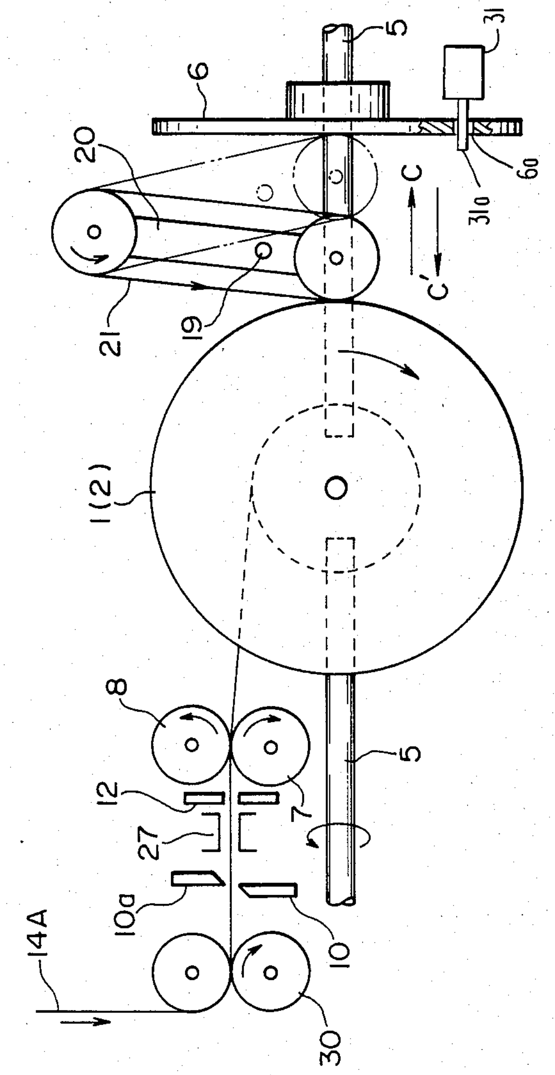
FIG. 2 is a schematic side view of a portion of the device of FIG. 1.
Figure 3:
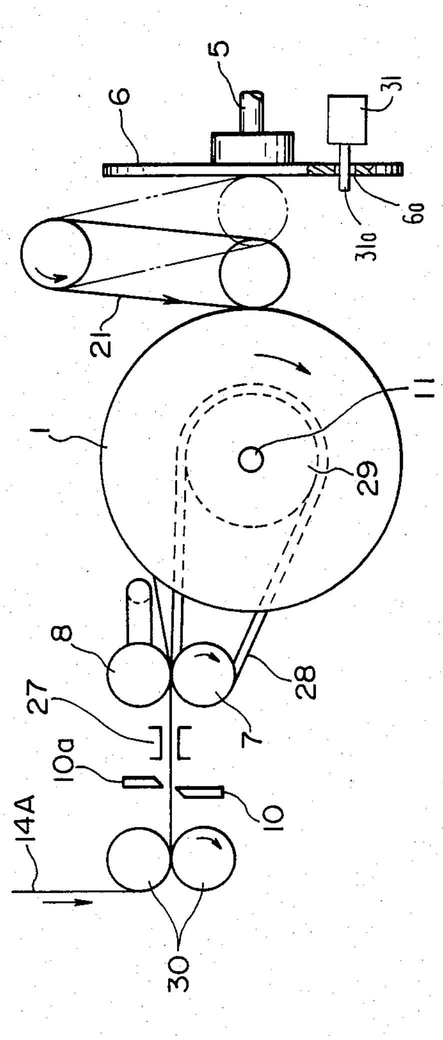
FIG. 3 is a further schematic side view of a portion of the device of FIG. 1.

Referring now to FIGS. 1, 2 and 3 of the accompanying drawings, reference numerals 1 and 2 designate a pair of film holding reels on which film can be stored and from which film can be dispensed. The reels 1 and 2 are rotatably mounted on a shaft 11, which extends perpendicular to a rotatable shaft 5 to which it is attached at a center portion. As will be explained in more detail below, rotation of the shaft 5 effects the switching of tracks, that is, the switching of the functions of the reel 1 and 2 between take-up and film dispensing functions. A rotary plate 6 is provided to the rear of the reels 1 and 2. The plate 6 is affixed to the shaft 5 to rotate therewith. Rotation of the plate 6 and shaft 5 through 180 degrees is effective to execute a track switching operation.

A first drive belt 21 is disposed between the take-up reel (here assumed to be the reel 1) and the plate 6. This lower end of the belt 21 can be selectively engaged with either the reel 1 or the rotary plate 6 by a connecting rod 19 which has one end affixed to a support member 20 which supports the rollers around which the belt 21 is wound. Drive power for the film storage section is provided by a third drive belt 23, one end of which is driven by a motor (not shown), and a connecting shaft 24.

In FIG. 1, reference numeral 14A designates a film which has been exposed in the photographing section (not shown), while reference numeral 14B indicates exposed film which has been stored in the film storage device and is being fed to the processing section (not shown). The film 14A is wound onto the take-up reel 1 via a film guide 27 (FIG. 2), a film feeding roller 7 and a contact roller 8. To wind the film 14A onto the reel 1, the first drive belt 21 is positioned in contact with the outer periphery of the take-up reel 1. Rotational force is then transmitted from the take-up reel 1 to the film feeding roller 7 through a drive arrangement such as a belt 28 or gears (not shown), whereupon the film 14A is wound onto the reel 1 at a speed determined by the speed of the first drive belt 21.

When a sufficient amount of the film 14A has been wound onto the take-up reel 1, a movable cutter blade 10, disposed opposite a fixed cutter blade 10*a* and prior to the storage section, is actuated by an output signal from a detecting device (not shown) which detects the amount of film wound onto the reel 1. The film 14A is then cut. The movable cutter blade 10 is actuated by a solenoid 9. Simultaneously with the actuation of the movable cutter blade 10, the first drive belt 21 is moved away from the outer periphery 3 of the take-up reel 1 and is moved, in the direction of the arrow C, into contact with the surface of the rotary plate 6.

As shown in FIG. 1, to synchronize the movement of the movable cutter blade 10 with movement of the first drive belt 21, a link mechanism composed of levers 15, 16 and 18 is disposed between the movable cutter blade 10 and the connecting rod 19. An upper end of the lever 15 is pivotally connected to one end of the movable cutter blade 10, the other end of which is pivotally connected adjacent a corresponding end of the fixed cutter blade 10*a*. The lower end of the lever 15 is fixedly connected to an intermediate portion of the lever 16. One end of the lever 16 is pivotally connected to a support 16*a*, while the other end is rotatably joined with the L-shape lever 18 through a slot 16*b*. The arm of the lever 18 which joins the lever 16 is pulled downwardly by a spring 17. The lever 18 is pivotally connected about a shaft 18*a* near its center. A slot 18*b* formed in the upper arm of the lever 18 permits connection with the connecting rod 19. Thus, when the movable cutter blade 10 is actuated, the lever 16 is pulled upwardly, rotating the lever 18 in the clockwise direction (in the direction of the arrow C), and thus pivoting the support member 20 to move the lower end of the first drive belt 21 away from the periphery 3 of the take-up reel 1 and into contact with the surface of the rotary plate 6.

When the driving force of the first drive belt 21 is transmitted to the rotary plate 6, the plate 6 rotates, thereby causing the rotary shaft 5 to rotate. Accordingly, the reels 1 and 2 are rotated through an angle of 180 degrees so that the film from the full reel can be dispensed to the processing section and new film 14A accepted from the photographing section.

During the swing of the reels 1 and 2, the cut end of the film 14A is moved through a semicircular opening 13 formed in a side wall 12 of the film storage section with the cut end of the film on the side of the reel 1 being sandwiched and held by the film guide 27.

In order to stop the rotary shaft 11 after it has rotated through 180 degrees, a slot 6*a* may be provided in the rotary plate 6 and a ratchet mechanism 31 provided adjacent the plate 6, with the ratchet 31*a* engaging the slot 6*a* after the plate 6 has rotated through the requisite angle.

The belt 28 is composed of a stretchable materials such as a rubber belt or a coil spring, which provides frictional transmission between a pulley 32 connected to the shaft 7(*a*) of the drive roller 7 and a pulley 29 connected to the rotary shaft 11 of the take-up reel 1. The rollers 7 and 8 are thus rotated by rotation of the reel 1. The diameter of the pulley 7*a* associated with the drive roller 7 is designed to be smaller than that of the pulley 29 coupled to the reel 1, and the respective rotational speeds $V_1$ and $V_2$ of the drive roller 30 and the pulley 29 have a rotationship $V_1 < V_2$. Thus, the drive roller 7 feeds the film 14A onto the reel 1 accompanying a slip of the belt 29. Accordingly, the film will always be tensioned between the roller 7 and the reel 1.

In operation, when a designated amount of film 14A wound onto the take-up reel 1 has been detected, the drive rollers 30, which feed the film from the photographing section, are stopped, thereby stopping the feeding of the film 14A from the photographing section. However, power is still transmitted to the drive belt 21, and thus the film is tensioned prior to actuation of the movable cutter blade 10. After the film 14A has been cut and the drive belt 21 separated from the take-up reel 1, the take-up reel is freed. At the instant that the take-up reel is freed, the tension contained in the belt 28 is released by reverse rotation of the reel 1. This causes the cut end of the film 14A to be forced back towards the cutting position.

Accordingly, with the mechanism of the invention, the cut end of the film 14A is always maintained at the cutting position; that is, there is no danger that the cut end of the film 14A will be wound onto the take-up reel 1. This state is maintained until the take-up reel 1 has been rotated to perform the function of the dispensing reel and the film is dispensed toward the processing section.

Returning to FIGS. 1, 2 and 3 because the amount of film wound onto the reels 1 and 2 is not necessarily the same, there may be some unbalance in weight between the reels 1 and 2, thereby resulting in difficulty in smoothly performing the operation of rotating the reels 1 and 2 through 180 degrees to exchange their positions. To overcome this problem, in accordance with the invention, a friction brake device 26 is provided which exerts a frictional force on the shaft 5.

When the reel 1 is rotated into the dispensing position, a second drive belt 22, similar in structure to the first drive belt 21, is moved into contact with the periphery 4 of that reel. The reel is then rotated, in the reverse direction from the take-up position, to thereby dispense film to the processing section at a speed determined by the speed of the second drive belt 22. The reel 1 in the take-up position is then able to simultaneously receive film from the photographing section.

As described above, because the drive device for rotating the take-up reel 1 is the same device used to rotate the rotary plate 6 and the shaft 5, the film storage device of the invention is quite simple in structure. Moreover, the overall size of the device can be made compact, and the device can be manufactured inexpensively. Also, the amount of film which can be stored in the device is quite large, corrresponding to the size of two full reels.

Although the invention has been explained with reference to a preferred embodiment, the invention is not limited thereto, as various changes and modifications can be made to the preferred embodiment without departing from the spirit and scope of the invention. For example, other arrangements can be used for rotating the shaft 5 on which the two reels 1 and 2 are mounted.

Further, although in the described preferred embodiment the member for rotating the shaft 5 is a rotary disk having a rough surface, other drive arrangements can be used, for instance, a driving gear mechanism. Also, the invention is not limited to the case where rotation of the rotary plate is effected upon actuation of a cutter mechanism, and the rotary plate may be directly rotated by some other mechanism.

Still further, the invention is not limited to the case where the film is cut, and may be employed in applications in which the film is not cut.

Moreover, the invention is not limited to the described arrangement wherein a drive belt is used to supply the driving force for the take-up reel and the rotary plate. All that is necessary is that the driving device be capable of being switched between driving of the take-up reel 1 and the rotary plate 6 (or an alternative element which performs the function of the rotary plate 6).

Moreover, more than two reels can be employed if desired. Finally, although the invention has been described with reference to photographic film, particularly, to microfilm, the invention is by no means limited thereto, and can be applied to other types of webs.

I claim:

1. A film storage device comprising: first and second rotatable reels for storing a film, a rotatable shaft, said first and second reels being coupled to said rotatable shaft and being rotatable about an axis extending perpendicular to a longitudinal axis of said rotary shaft; a rotary plate coupled to said rotary shaft and having a plane extending perpendicular to said longitudinal axis of said rotary shaft; and movable driving means, said movable driving means being selectively positionable to engage either at least one of said reels or to said rotary plate supplying driving power.

2. The film storage device of claim 1, wherein said driving means comprises: a first drive belt; a drive roller; and a freely rotatable roller, said first drive belt being passed around said rollers.

3. The film storage device of claim 2, wherein said driving means further comprises: a support plate extending between said rollers, and support plate being pivotally mounted in the vicinity of said drive roller, whereby an end of said first drive belt adjacent said freely rotatable roller is selectively positionable in contact with either an outer periphery of said at least one of said reels or a planar surface of said rotary plate.

4. The film storage device of claim 3, further comprising: cutter means; and a link mechanism coupling said cutter means to said support plate, whereby actuation of said cutter means to cut a web passing therethrough moves said first drive belt from engagement with said at least one of said reels to engagement with said rotary plate.

5. The film storage device of claim 4, further comprising: a pair of rollers for directing a web onto said at least one of said reels; and a stretchable elastic drive member drivingly engaged with one of said pair of rollers and said at least one of said reels.

6. The film storage device of claim 5, further comprising: first and second pulleys coupled, respectively, to said one of said pair of roller and said at least one of said reels, said stretchable elastic drive member being laid around said first and second pulleys, said first pulley having a diameter smaller than that of said second pulley, whereby a peripheral speed of said one of said pair of rollers is less than a speed of said web as said web is being wound onto said at least one of said reels so that said web is maintained under tension while being wound onto said at least one of said reels, and, when said web is cut upon actuation of said cutter means, elastic force accumulated in said drive member is released to reversely rotate said at least one of said reels to thereby maintain a cut end of said web at a predetermined position.

7. The film storage device of claim 1, further comprising frictional drive means coupled to said shaft for providing a frictional force on said shaft acting against rotation of said shaft.

* * * * *